US012452166B2

(12) United States Patent
Hu

(10) Patent No.: US 12,452,166 B2
(45) Date of Patent: Oct. 21, 2025

(54) PREVENTING AN INTER-CHASSIS-LINK LOOP USING A SELECTIVE FORWARDING DELAY

(71) Applicant: Ruckus IP Holdings LLC, Claremont, NC (US)

(72) Inventor: Maocheng Hu, Fremont, CA (US)

(73) Assignee: Ruckus IP Holdings LLC, Claremont, NC (US)

( * ) Notice: Subject to any disclaimer, the term of this patent is extended or adjusted under 35 U.S.C. 154(b) by 385 days.

(21) Appl. No.: 17/968,835

(22) Filed: Oct. 19, 2022

(65) Prior Publication Data
US 2023/0128729 A1 Apr. 27, 2023

Related U.S. Application Data

(60) Provisional application No. 63/271,351, filed on Oct. 25, 2021.

(51) Int. Cl.
*H04L 45/28* (2022.01)
*H04L 12/46* (2006.01)
*H04L 45/00* (2022.01)
*H04L 45/18* (2022.01)

(52) U.S. Cl.
CPC ............ *H04L 45/28* (2013.01); *H04L 12/462* (2013.01); *H04L 45/18* (2013.01); *H04L 45/22* (2013.01); *H04L 45/66* (2013.01)

(58) Field of Classification Search
CPC ....... H04L 45/28; H04L 12/462; H04L 45/18; H04L 45/22; H04L 45/66
See application file for complete search history.

(56) References Cited

U.S. PATENT DOCUMENTS

| | | | | |
|---|---|---|---|---|
| 2007/0242602 | A1* | 10/2007 | Pang | ........................ H04L 45/02 370/254 |
| 2018/0331855 | A1* | 11/2018 | Subramanian | ...... H04L 12/4625 |
| 2020/0177438 | A1* | 6/2020 | Nandy | ..................... H04L 12/18 |
| 2020/0389386 | A1* | 12/2020 | Uscumlic | ................ H04L 45/22 |
| 2021/0160099 | A1* | 5/2021 | Rozenboim | ............. H04L 47/32 |

OTHER PUBLICATIONS

"Ruckus Networks Multi-Chassis Trunking (MCT) Essentials", Part No. 53-1005591-01, Feb. 14, 2019, Ruckus, an ARRIS company, 17 Pages. (Year: 2019).*

* cited by examiner

*Primary Examiner* — Brian J. Gillis
*Assistant Examiner* — Chhian (Amy) Ling
(74) *Attorney, Agent, or Firm* — Steven Stupp

(57) ABSTRACT

A computer network device (such as a switch or a router) that prevents loop occurrence is described. During operation, the computer network device communicates, via one or more ports, data packets with a corresponding one or more second ports in a second computer network device, where a given data packet includes a source address and a destination address, and where the one or more ports and the second one or more ports specify a link between the computer network device and the second computer network device. Moreover, when the link goes down and then comes back up, the computer network device may block forwarding, via the one or more ports, of additional data packets based at least in part on a predefined delay.

20 Claims, 9 Drawing Sheets

PREVENTING AN INTER-CHASSIS-LINK LOOP USING A SELECTIVE FORWARDING DELAY

CROSS REFERENCE TO RELATED APPLICATIONS

This application claims priority under 35 U.S.C. 119(e) to U.S. Provisional Application Ser. No. 63/271,351, "Preventing an Inter-Chassis-Link Loop Using a Selective Forwarding Delay," filed on Oct. 25, 2021, by Maocheng Hu, the contents of which are herein incorporated by reference.

FIELD

The described embodiments relate to techniques for preventing an inter-chassis-link (ICL) loop by selectively delaying the forwarding of ICL messages, such as data packets.

BACKGROUND

Multi-chassis trunking (MCT) allows users to connect two switches to form a single logical unit known as a 'cluster.' Users can then physically split the ports of a single link aggregation group (LAG) on a third electronic device (which is sometimes referred to as a 'client') and connect them to the two switches that are part of the cluster. When configured in this way, the cluster appears to be a single unit to the client and thus may provide electronic-device-level fault tolerance and high network resiliency.

In some MCT implementation, two switches may be interconnected using a single link or a LAG, which is sometimes referred to as an ICL. For example, some network protocols (such as a cluster communication protocol or CCP) may run on the ICL and may establish a transmission control protocol (TCP) session to form a single logical device, which is referred to as a 'cluster.' Moreover, the ICL may configured to be a tagged member of a dedicated virtual local area network (VLAN), which is referred to as a 'session VLAN.' The session VLAN may provide a secure control path for data packet exchanges between the two switches.

Furthermore, after the cluster is established, users can scale the network by adding one or more additional instances of electronic devices as one or more clients. For example, a client may be: a switch, a router, a server or a storage solution. Note that member ports of the dynamic/static LAG on the client may be physically split and connected to both the switches in the cluster, which may provide two highly available, load-balanced, and redundant data paths to the cluster.

Additionally, in a traditional network that typically needs client-client physical connection apart from an MCT cluster, a spanning tree protocol (STP) may be configured to avoid network loops. MCT must work along with STP in order to best suit the network. While STP may be disabled by default on MCT, the switches may forward (or broadcast) STP messages that help maintain a loop-free network topology. For example, the switches may forward bridge protocol data units (BPDUs) with source and destination information that can be used to detect loops in the network topology.

Note that BPDU forwarding may only prevent loops so long as the BPDU forwarding assumption exists. Stated differently, BPDU forwarding may only prevent loops when the whole cluster behaves like a hub in a layer 2 (L2) network.

However, this assumption is no longer true when ICL is down. In such cases, a BPDU cannot be forwarded between the switches in a cluster. Moreover, when ICL comes back (e.g., transitions from down to up), the ICL may forward traffic that can result in an L2 loop.

SUMMARY

A computer network device that prevents loops in a network is described. This computer network device may include one or more ports that is configured to communication with a second computer network device. During operation, the computer network device communicates, via the one or more ports, data packets with a corresponding one or more second ports in the second computer network device, where a given data packet includes a source address and a destination address, and where the one or more ports and the second one or more ports specify a link between the computer network device and the second computer network device. Moreover, when the link goes down and then comes back up, the computer network device blocks forwarding, via the one or more ports, of additional data packets based at least in part on a predefined delay.

Note that the data packets may include BPDUs.

Moreover, the communication may include forwarding or broadcasting at least a subset of the data packets.

Furthermore, the link may include a control or a data link. For example, the link may include an ICL.

Additionally, the computer network device may block the forwarding of the additional data packets for a time interval. For example, the time interval may correspond to a second time interval between sequential data packets in the data packets.

In some embodiments, the predefined delay may be configurable.

Moreover, the computer network device may include a switch or a router.

Furthermore, the computer network device may prevent an L2 loop from occurring in the network based at least in part on the data packets.

Another embodiment provides a system (such as a cluster) that includes the computer network device and the second computer network device.

Another embodiment provides a computer-readable storage medium for use with the computer network device or the system. When executed by the computer network device or at least a component in the system, this computer-readable storage medium causes the computer network device or at least the component in the system to perform at least some of the aforementioned operations.

Another embodiment provides a method, which may be performed by the computer network device or at least a component in the system. This method includes at least some of the aforementioned operations.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
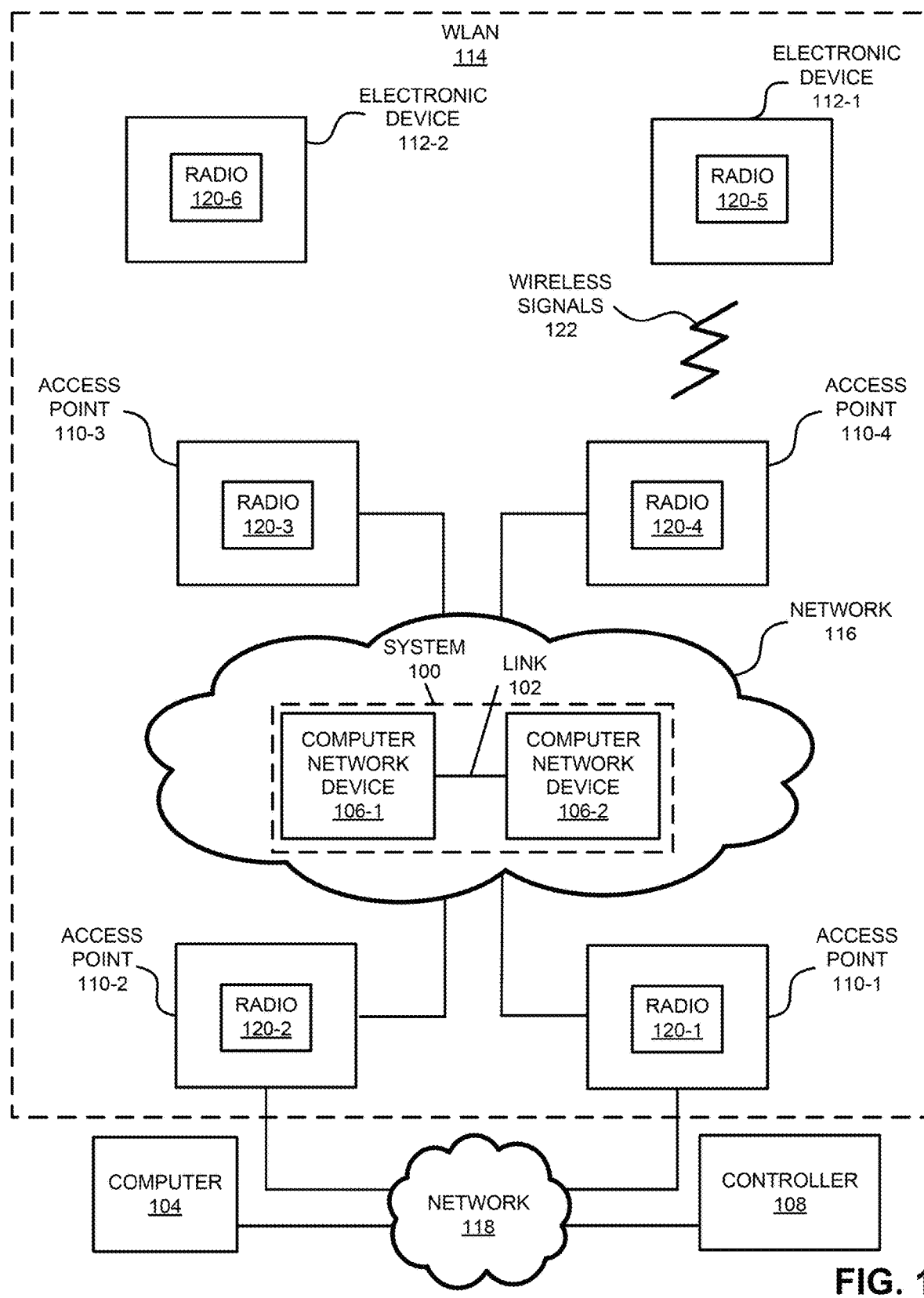
FIG. 1 is a block diagram illustrating an example of communication among access points and electronic devices in a network in accordance with an embodiment of the present disclosure.

A computer network device (such as a switch or a router) that prevents loop occurrence in a network is described. During operation, the computer network device communicates, via one or more ports, data packets with a corresponding one or more second ports in a second computer network device, where a given data packet includes a source address and a destination address, and where the one or more ports and the second one or more ports specify a link between the computer network device and the second computer network device. Moreover, when the link goes down and then comes back up, the computer network device may block forwarding, via the one or more ports, of additional data packets based at least in part on a predefined delay.

By blocking the forwarding of the additional data packets, these communication techniques may prevent the loop occurrence in the network that includes the switch and the second switch. Notably, when the link comes back (e.g., transitions from down to up), the link may immediately forward the additional data packets. Because the one or more ports and/or the second one or more ports may not yet be in a configured or desired state, an L2 loop may result. However, by blocking the forwarding for a time interval, the communication techniques may ensure that the one or more ports and/or the second one or more ports may be in the configured state, thereby preventing the occurrence of the L2 loop. Consequently, the communication techniques may improve the user experience when using the switch, the second switch or a system (such as a cluster) that includes the switch or the second switch.

In the discussion that follows, MCT may provide an alternative to spanning tree protocols. Spanning tree is a technology that protects a network against loops by blocking necessary ports, and having the network span to relearn topologies when a link fails in the network. MCT is a technology that allows two supporting computer network devices to cluster together and appear as a single logical device. Trunking is a technology that allows multiple links of a computer network device to appear as one logical link. The combination of MCT and trunking may provide a resilient network topology that uses some or all the links in the network, thereby creating a network topology for latency sensitive applications.

Moreover, static or dynamic link aggregation control protocol (LACP) trunks may provide link-level redundancy and increased capacity. However, the trunks may not provide computer-network-device-level redundancy. If the computer-network-device to which a trunk is attached fails, the entire trunk may lose network connectivity. Furthermore, two computer network devices may be needed for network resiliency with trunked links to both of the computer network devices. With spanning tree, one of these trunks may be blocked from use until the failure of the other trunk is detected, which may take between 1-30 seconds, potentially adding latency and jitter, not only on the affected computer network devices locally, but throughout the span topology. With MCT, member links of the trunk may be split and connected to two clustered MCI-supporting computer network devices. Additionally, MCT may include integrated loop detections, which allows all links to be active. If a failure is detected, traffic may be dynamically allocated across the remaining links. This failure detection and allocation of traffic may occur in sub-second time, without impact on the rest of the network.

Consequently, MCT may inherent the benefits of a trunk group and may allow multiple physical links to act as a single logical link. The resulting available bandwidth may be an aggregate of all the links in the group. Traffic may be shared across the links in the group using dynamic flow-based load balancing, and traffic may be moved to a remaining link group in sub-seconds if a failure occurs on one of the links. MCT may eliminate the single point of failure that exists at the computer-network-device level when all links of a trunk terminate on the same computer network device without the overhead associated with spanning tree. MCI may divert a subset of the links to a second computer network device to provide redundancy and sub-second fault detection at the computer-network-device level.

In the discussion that follows, an access point and/or an electronic device (such as a recipient electronic device, which is sometimes referred to as a 'client') may communicate packets or frames in accordance with a wireless communication protocol, such as an Institute of Electrical and Electronics Engineers (IEEE) 802.11 standard (which is sometimes referred to as 'Wi-Fi,' from the Wi-Fi Alliance of Austin, Tex.), Bluetooth (from the Bluetooth Special Interest Group of Kirkland, Wash.), and/or another type of wireless interface. In the discussion that follows, Wi-Fi is used as an illustrative example. For example, an IEEE 802.11 standard may include one or more of: IEEE 802.11a, IEEE 802.11b, IEEE 802.11g, IEEE 802.11-2007, IEEE 802.11n, IEEE 802.11-2012, IEEE 802.11-2016, IEEE 802.11ac, IEEE 802.11 ax, IEEE 802.11ba, IEEE 802.11be, or other present or future developed IEEE 802.11 technologies.

However, a wide variety of communication protocols (such as Long Term Evolution or LTE, another cellular-telephone communication protocol, etc.) may be used. The wireless communication may occur in one or more bands of frequencies, such as: a 900 MHz, a 2.4 GHz, a 5 GHz, 6 GHz, the Citizens Broadband Radio Spectrum or CBRS (e.g., a frequency band near 3.5 GHz), a band of frequencies used by LTE or another cellular-telephone communication protocol or a data communication protocol, and/or a 60 GHz frequency band. (Note that IEEE 802.11ad communication over a 60 GHz frequency band is sometimes referred to as 'WiGig.' In the present discussion, these embodiments also encompassed by 'Wi-Fi.') In some embodiments, communication between electronic devices may use multi-user transmission (such as orthogonal frequency division multiple access or OFDMA).

Moreover, the electronic device and/or the access point may communicate with one or more other access points and/or computers in a network using a wireless or a wired communication protocol, such as an IEEE 802.11 standard, an IEEE 802.3 standard (which is sometimes referred to as 'Ethernet') and/or another type of wired or wireless interface. In the discussion that follows, Ethernet is used as an illustrative example of communication between the electronic device and/or the access point and the one or more other access points and/or computers in the network.

FIG. 1 presents a block diagram illustrating an example of communication among one or more access points 110 and electronic devices 112 (such as a cellular telephone, and which are sometimes referred to as 'clients') in a WLAN 114 (which is used as an example of a network) in accordance with some embodiments. Access points 110 may communicate with each other in WLAN 114 using wireless and/or wired communication (such as by using Ethernet or a communication protocol that is compatible with Ethernet). Note that access points 110 may include a physical access point and/or a virtual access point that is implemented in software in an environment of an electronic device or a computer. In addition, at least some of access points 110 (such as access points 110-3 and 110-4) may communicate with electronic devices 112 using wireless communication.

The wired and/or wireless communication among access points 110 in WLAN 114 may occur via network 116 (such as an intra-net, a mesh network, point-to-point connections and/or the Internet) and may use a network communication protocol, such as Ethernet. For example, WLAN 114 may include one or more computer network devices 106 (e.g., a switch or a router). In some embodiments, the one or more computer network device 106 may include a stacking system of multiple computer network devices (which are sometimes referred to as 'stacking units'). This stacking system may designate one of computer network devices 106 as an active computer network device and one or more of the remaining computer network devices 106 as a standby computer network device. The active computer network device may software for control protocols and user configuration of the stacking system, and the standby computer network device may provide switchover backup for the active computer network device.

Furthermore, the wireless communication using Wi-Fi may involve: transmitting advertising frames on wireless channels, detecting one another by scanning wireless channels, establishing connections (for example, by transmitting association or attach requests), and/or transmitting and receiving packets or frames (which may include the association requests and/or additional information as payloads). In some embodiments, the wired and/or wireless communication among access points 110 also involves the use of dedicated connections, such as via a peer-to-peer (P2P) communication technique. Therefore, access points 110 may support wired communication outside of WLAN 114 (such as Ethernet) and wireless communication within WLAN 114 (such as Wi-Fi), and one or more of access points 110 may also support a wired communication protocol for communicating via network 118 with electronic devices (such as a computer 104 or a controller 108 of WLAN 114, which may be remoted located from WLAN 114).

Figure 9:
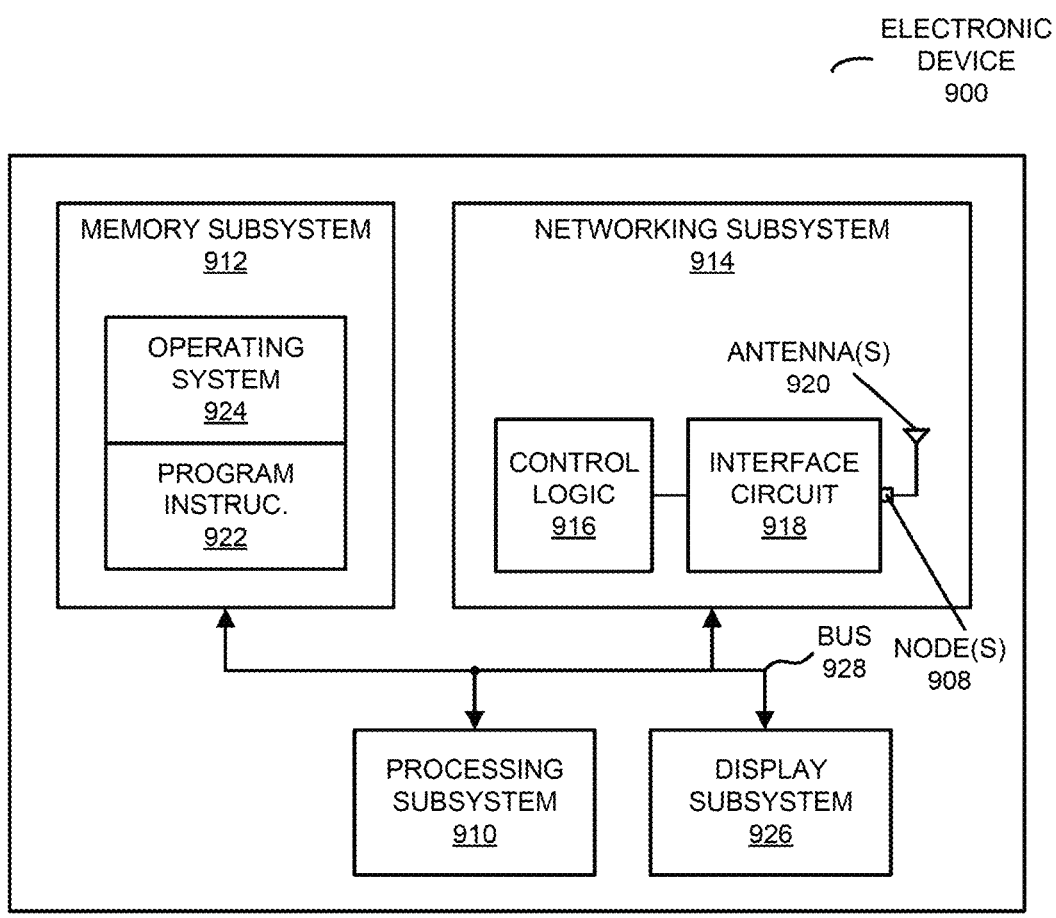
FIG. 9 is a block diagram illustrating an example of an electronic device in accordance with an embodiment of the present disclosure.

As described further below with reference to FIG. 9, the one or more computer network device 106, access points 110 and/or electronic devices 112 may include subsystems, such as a networking subsystem, a memory subsystem and a processor subsystem. In addition, access points 110 and electronic devices 112 may include radios 120 in the networking subsystems. More generally, access points 110 and electronic devices 112 can include (or can be included within) any electronic devices with the networking subsystems that enable access points 110 and electronic devices 112 to communicate with each other using wireless and/or wired communication. This wireless communication can comprise transmitting advertisements on wireless channels to enable access points 110 and/or electronic devices 112 to make initial contact or detect each other, followed by exchanging subsequent data/management frames (such as association requests and responses) to establish a connection, configure security options (e.g., Internet Protocol Security), transmit and receive packets or frames via the connection, etc. Note that while instances of radios 120 are shown in access points 110 and electronic devices 112, one or more of these instances may be different from the other instances of radios 120.

As can be seen in FIG. 1, wireless signals 122 (represented by a jagged line) are transmitted from radio 120-4 in access point 110-4. These wireless signals may be received by radio 120-5 in electronic device 112-1. Notably, access point 110-4 may transmit packets or frames. In turn, these packets or frames may be received by electronic device 112-1. Moreover, access point 110-4 may allow electronic device 112-1 to communicate with other electronic devices, computers and/or servers via networks 116 and/or 118.

Note that the communication among access points 110 and/or with electronic devices 112 (and, more generally, communication among components in WLAN 114) may be characterized by a variety of performance metrics, such as: a received signal strength (RSSI), a data rate, a data rate for successful communication (which is sometimes referred to as a 'throughput'), an error rate (such as a retry or reseed rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

In the described embodiments processing a packet or frame in access points 110 and electronic devices 112 includes: receiving signals (such as wireless signals 122) corresponding to the packet or frame; decoding/extracting the packet or frame from received wireless signals 122 to acquire the packet or frame; and processing the packet or frame to determine information contained in the packet or frame.

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

As noted previously, when a link 102 (such as an ICL) between ports in two of computer network devices 106 goes down and comes back up, a loop may occur. Notably, if either of the computer network devices 106 immediately forward data traffic (such as BPDUs) via link 102, an L2 loop may occur.

Moreover, as described further below with reference to FIGS. 2-8, in order to address these problems, at least one of computer network devices 106 (such as computer network device 106-1) may implement the communication techniques. Notably, computer network device 106-1 may communicate (such as forwarding or broadcasting and/or receiving), via one or more ports, data packets (such as BPDUs) with a corresponding one or more second ports in computer network device 106-2. Note that a given data packet may include a source address (such as a media access control or MAC address or Internet protocol or IP address of computer network device 106-1) and a destination address (such as a MAC address or an IP address of computer network device 106-2), and where the one or more ports and the second one or more ports specify link 102 (such as a control or a data link, e.g., an ICL) between computer network device 106-1 and computer network device 106-2. Furthermore, computer network device 106-1 may optionally prevent an L2 loop from occurring in a network based at least in part on the data packets. Additionally, when link 102 goes down and then comes back up, computer network device 106-1 may block forwarding, via the one or more ports, of additional data packets based at least in part on a predefined delay. Note computer network device 106-1 may block the forwarding of the additional data packets for a time interval. For example, the time interval may correspond to a second time interval or period (which is sometimes referred to as a 'hell time') between sequential data packets in the data packets. In some embodiments, the predefined delay may be configurable.

In this way, computer network devices 106 may implement the communication techniques. Consequently, the communication techniques may improve the performance of computer network devices 106 and/or a system 100 that includes computer network devices 106, and may reduce or eliminated occurrences of L2 loops. Therefore, the communication techniques may improve the user experience when using computer network devices 106 and/or system 100 that includes computer network devices 106.

Figure 2:
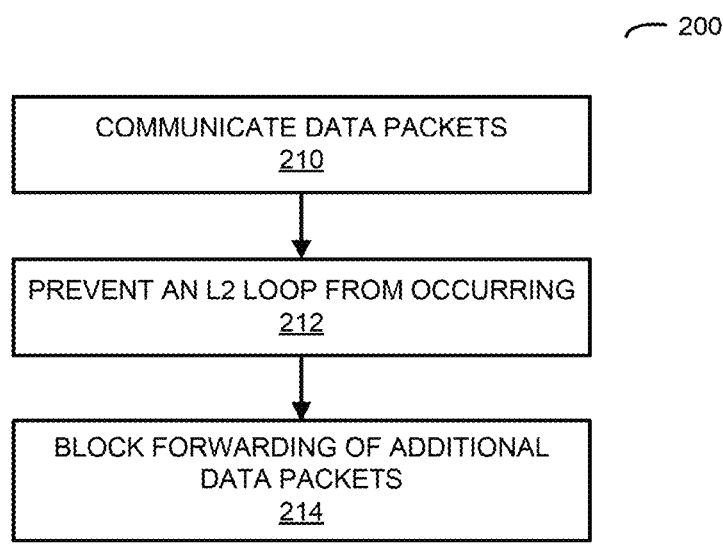
FIG. 2 is a flow diagram illustrating an example of a method for preventing loop occurrence in FIG. 1 in accordance with an embodiment of the present disclosure.

We now describe embodiments of a method. FIG. 2 presents a flow diagram illustrating an example of a method 200 for preventing loop occurrence in accordance with some embodiments. This method may be performed by a computer network device, such as one of the computer network devices 106 in FIG. 1.

During operation, the computer network device (such as a switch or a router) may communicate, via one or more ports, data packets (operation 210) with a corresponding one or more second ports in a second computer network device, where a given data packet includes a source address and a destination address, and where the one or more ports and the second one or more ports specify a link between the computer network device and the second computer network device.

Note that the data packets may include BPDUs. Moreover, the communication may include forwarding or broadcasting at least a subset of the data packets. Furthermore, the link may include a control or a data link. For example, the link may include an ICL.

Moreover, the computer network device may optionally prevent an L2 loop from occurring (operation 212) in a network based at least in part on the data packets. For example, the data packets may allow an L2 loop to be detected and, in response, the switch may modify a configuration (such as a port configuration) to prevent or eliminate the L2 loop. Alternatively or additionally, the computer network device may selectively forward at least a subset of the BPDUs.

Furthermore, when the link goes down and then comes back up, the computer network device may block forwarding, via the one or more ports, of additional data packets (operation 214) based at least in part on a predefined delay. Notably, the computer network device may block the forwarding of the additional data packets for a time interval. For example, the time interval may correspond to a second time interval between sequential data packets in the data packets. Note that the predefined delay may be configurable.

In some embodiments of method 200, there may be additional or fewer operations. Furthermore, the order of the operations may be changed, and/or two or more operations may be combined into a single operation.

Figure 3:
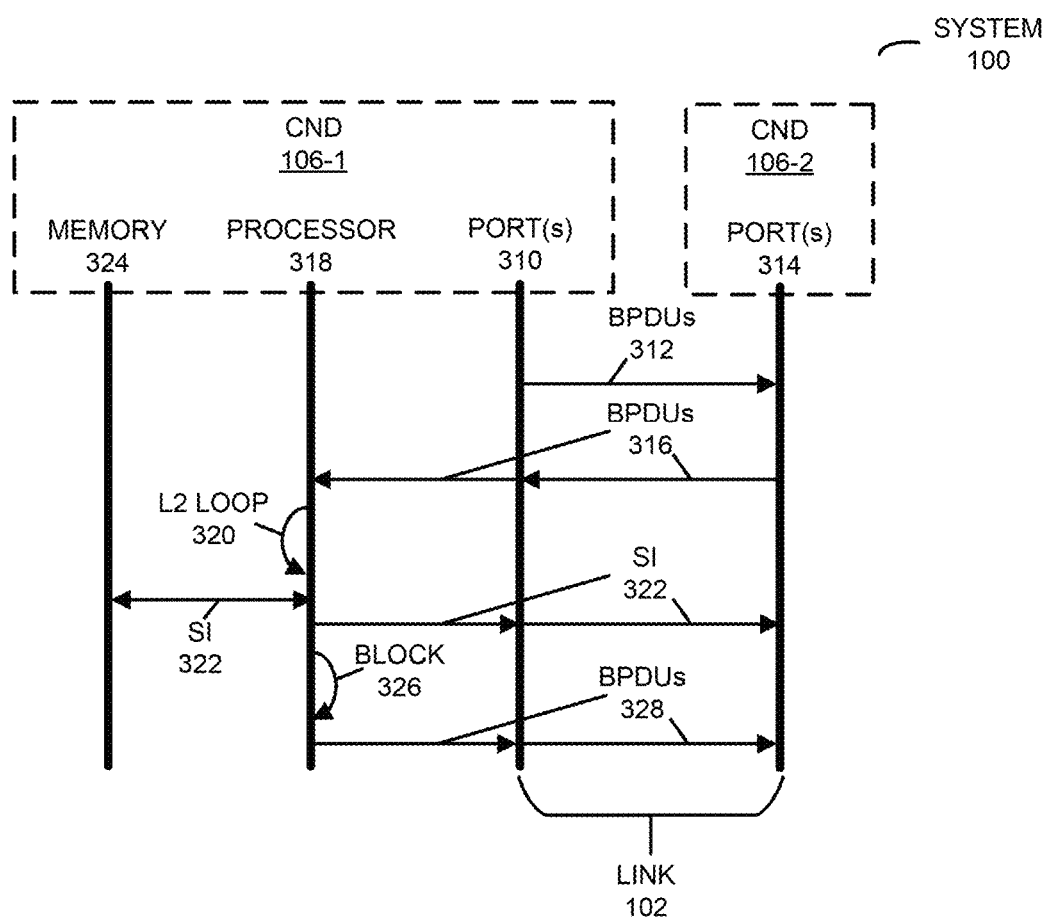
FIG. 3 is a drawing illustrating an example of communication between computer network devices in FIG. 1 in accordance with an embodiment of the present disclosure.

FIG. 3 presents a drawing illustrating an example of communication between computer network devices 106 in system 100 in accordance with some embodiments. Notably, computer network device 106-1 may forward, via one or more ports 310, BPDUs 312 to one or more ports 314 in computer network device 106-2. Moreover, computer network device 106-2 may forward, via the one or more ports 314, BPDUs 316 to the one or more ports 310 in computer network device 106-1. Note that the one or more ports 310 and the one or more ports 314 may specify link 102 between computer network device 106-1 and computer network device 106-2.

One or more ports 310 may provide BPDUs 316 to a processor 318 in computer network device 106-1. Processor 318 may optionally detect an L2 loop 320 based at least in part on BPUDs 316. When L2 loop 320 is detected, processor 318 may optionally perform a remedial action to prevent or eliminate L2 loop 320, such as by modifying port configuration or state information (SI) 322 for the one or more ports 310 (such as switching from forwarding to blocking) and/or the one or more ports 314 (which is stored in memory 324 in computer network device 106-1) and/or by selectively forwarding BPDUs 316 to other computer network device(s). Furthermore, processor 318 may provide, via the one or more ports 310, state information 322 to computer network device 106-2.

Additionally, when link 102 goes down (e.g., because of an issue or a failure in computer network device 106-1 and/or computer network device 106-2) and then comes back up, computer network device 106-1 may block 326 forwarding, via the one or more ports 310, of BPUDUs 328 based at least in part on a predefined delay. Notably, computer network device 106-1 may block 326 the forwarding of BPDUs 328 for a time interval. After time interval, computer network device 106-1 may forward, via the one or more ports 310, BPDUs 328 to the one or more ports 314 in computer network device 106-2.

While the preceding discussion illustrated computer network device 106-1 performing the communication techniques, in some embodiments computer network device 106-2 may, separately or in addition to computer network device 106-1, perform the communication techniques.

Moreover, while FIG. 3 illustrates communication between components using unidirectional or bidirectional communication with lines having single arrows or double arrows, in general the communication in a given operation in these figures may involve unidirectional or bidirectional communication.

Figure 4:
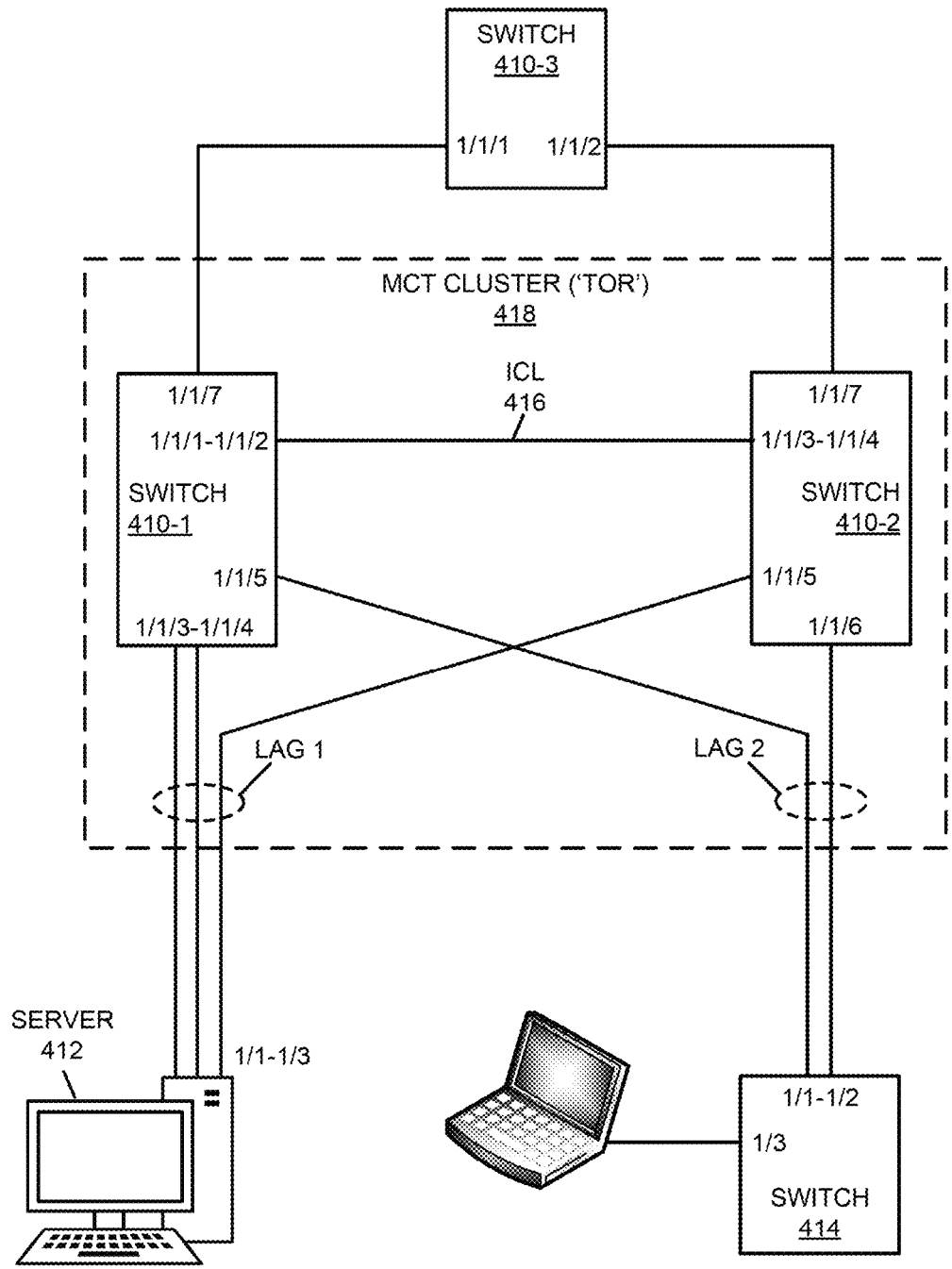
FIG. 4 is a drawing illustrating an example of communication between switches in accordance with an embodiment of the present disclosure.

We now further describe the communication techniques. FIG. 4 presents a drawing illustrating an example of communication between switches in accordance with some embodiments. Notably, as shown in FIG. 4, an MCT cluster 'TOR' 418 includes switches 410-1 and 410-2. Moreover, there are two clients in these embodiments. Client 1 is a server 412, while client 2 is a third-party switch 414. The port 1/1 within LAG 2 on switch 414 is connected with the port 1/1/5 on switch 410-1, while the port 1/2 within LAG 2 on switch 414 is connected with the port 1/1/6 on switch 410-2. Note that switch 414 may not be aware that its LAG is actually connected to two different switches. In order to support STP in MCI, switch 410-3 may generate forward or broadcast BPDUs, which are received by switch 414. The components in the dashed box in FIG. 4 may forward or broadcast the BPDUs. However, when port 1/1/2 in switch 410-3 receives a BPDU from port 1/1/1 in switch 410-3, port 1/1/2 may not forward the BPDU, thereby prevent an occurrence of an L2 loop.

Figure 5:
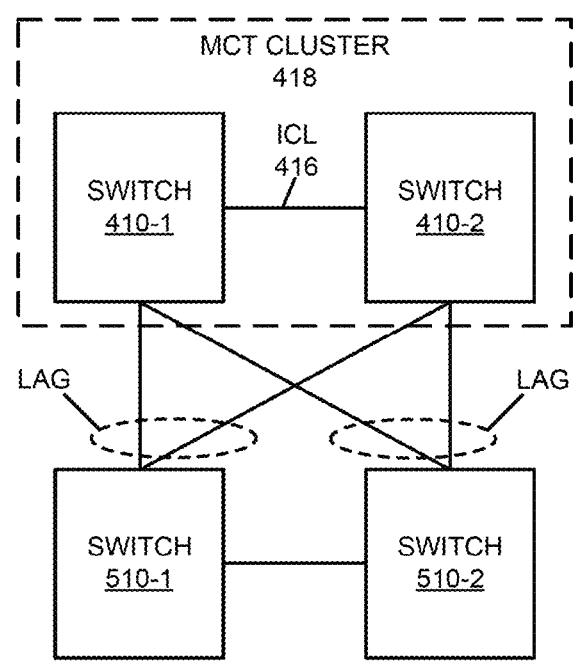
FIG. 5 is a drawing illustrating an example of communication between switches in accordance with an embodiment of the present disclosure.
Figure 6:
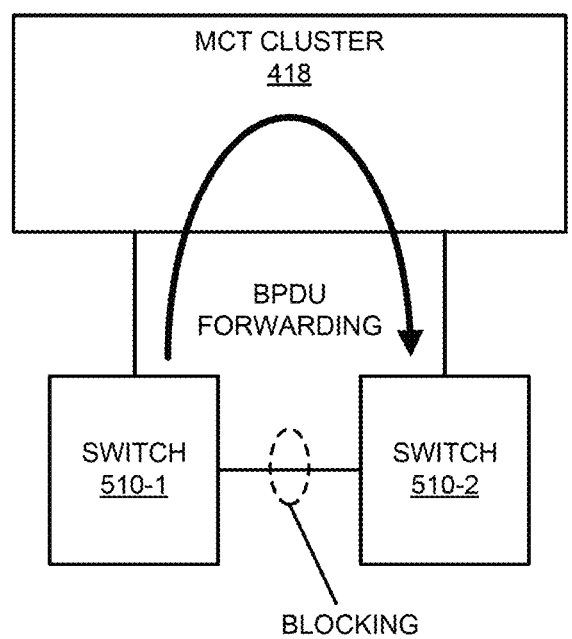
FIG. 6 is a drawing illustrating an example of communication between switches in accordance with an embodiment of the present disclosure.

Furthermore, as discussed previously, switches that implement MCT may communicate BPDUs to maintain a loop-free topology. FIG. 5 presents a drawing illustrating an example of communication between switches in accordance with some embodiments. Note that for an STP BPDU, MCI cluster 418 acts as a passthrough device. If the links between switches 510 are part of the same VLAN, then there is an L2 loop in the network, as shown in FIG. 6, which presents a drawing illustrating an example of communication between switches in accordance with some embodiments. In order to avoid an L2 loop, SIP may be run on switches 510. Additionally, MCT cluster 418 (which functions as a single logical device) may act as passthrough for the STP BPDUs and one of the client ports may be moved to blocking mode.

Figure 7:
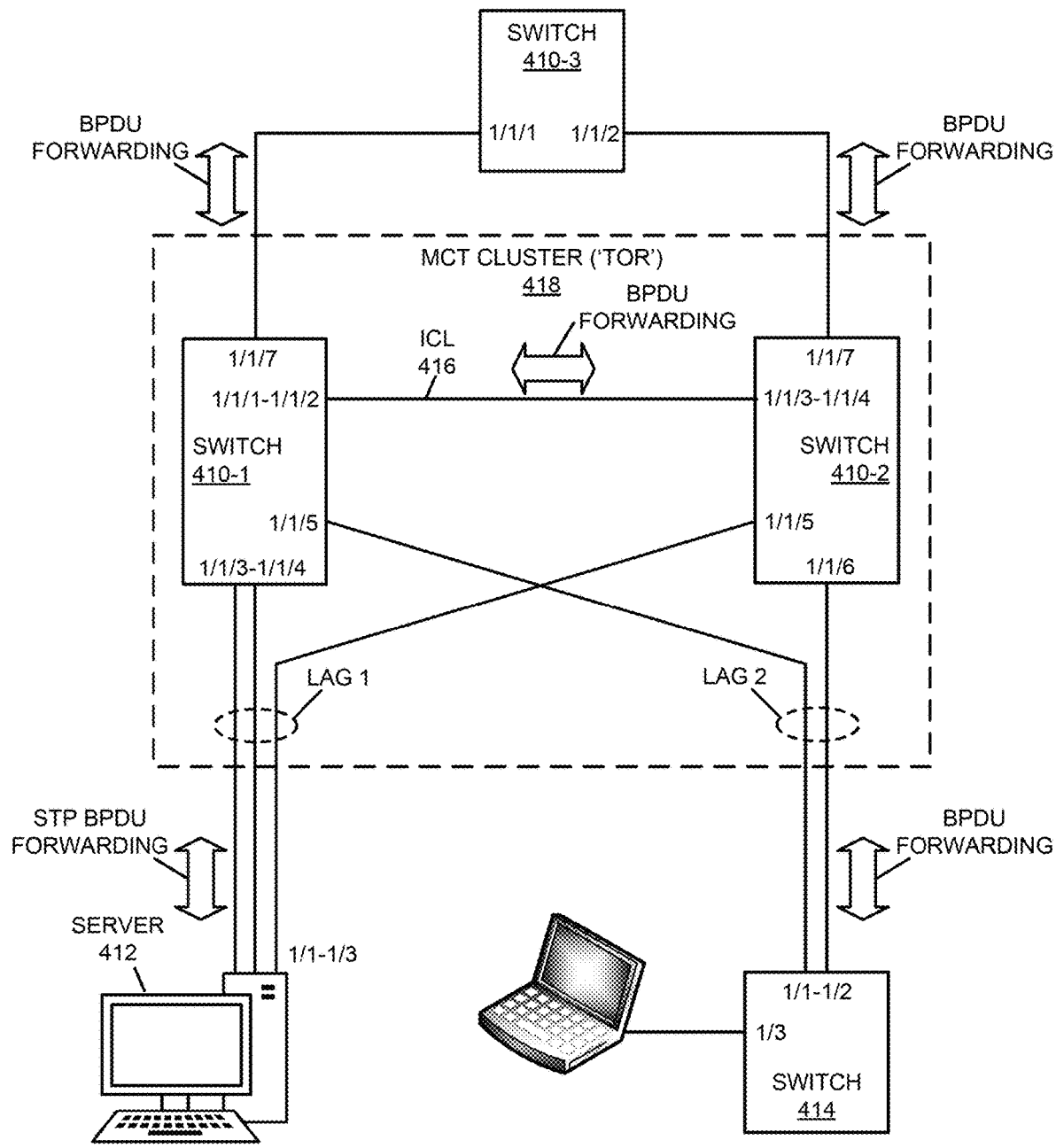
FIG. 7 is a drawing illustrating an example of communication between switches in accordance with an embodiment of the present disclosure.

However, as noted previously, BPDU forwarding may only work to prevent an L2 loop if the whole cluster behaves like a hub in an L2 network. For example, as shown in FIG. 7, which presents a drawing illustrating an example of communication between switches in accordance with some embodiments, the non-loop L2 topology may be managed by an STP instance running out of MCT cluster 418, which is uplink of switch 410-3 and client switch 414. In this topology, switch 410-3 blocks its port 1/1/2 to prevent the loop. This is because it (the port 1/1/2) continues receiving the superior BPDU sent by port 1/1/1 on switch 410-3 forwarded by the cluster switches 410-1 and 410-2. In FIG. 7, switch 410-3 may run SIP and may be the root bridge for the L2 network, and switch 414 may run STP and may be a non-root bridge in the L2 network. While MCI cluster switches 410-1 and 410-2 may not run SIP, the whole MCT cluster 418 may behave like a hub in a L2 network and, by forwarding or broadcasting STP BPDUs, which the cluster switches 410-1 and 410-2 may receive from their neighbor switches, the L2 loop may be prevented.

Figure 8:
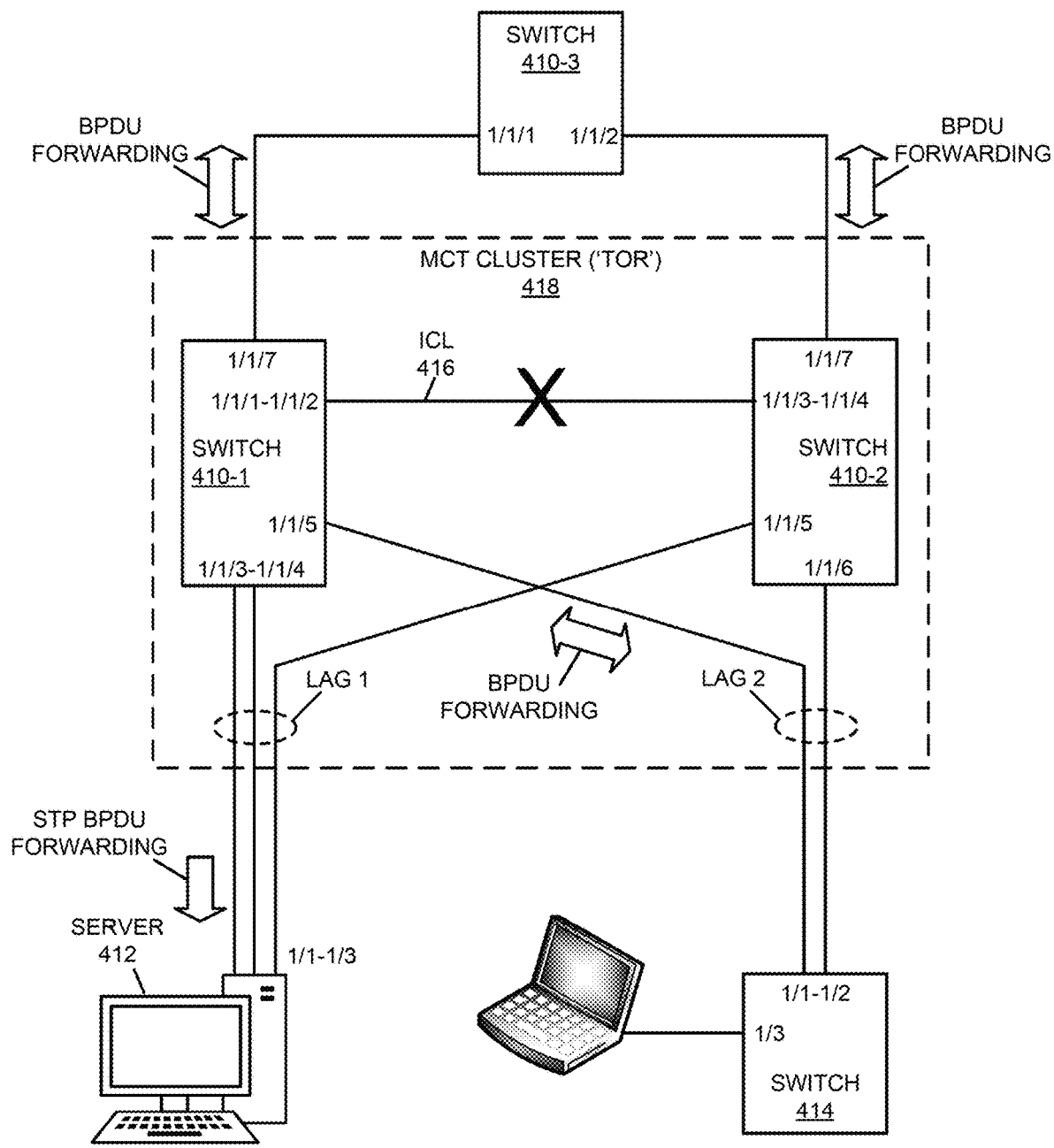
FIG. 8 is a drawing illustrating an example of communication between switches in accordance with an embodiment of the present disclosure.

When ICL 416 goes down, BPDUs cannot be forwarded between cluster switches 410-1 and 410-2. Note that in a typical MCT deployment, when ICL goes down, the CCP would go down with it and the whole cluster may run in a cluster down (CD) mode. The configuration and expected behavior may include: a loose mode with a keepalive VLAN (e.g., switch 410-1 may be in master role and may forward all traffic of its clients, and switch 410-2 may become a slave and may shut down all of its client interfaces, such as 1/1/5 towards server 412 and 1/1/6 towards switch 414); and a strict mode, in which both of the MCI cluster switches 410-1 and 410-2 may shut down their client interfaces. Regardless of the configuration used, there is no L2 loop when ICL 416 goes down, so the STP BPDU forwarding technique is not a problem. As shown in FIG. 8, which presents a drawing illustrating an example of communication between switches in accordance with some embodiments, because ICL 416 goes down and BPDUs cannot be forwarded between switches 410-1 and 410-2, and ports 1/1/1 and 1/1/2 on switch 410-3 both go to the designated forwarding state. Ports 1/1/5 and 1/1/6 on switch 410-2 may shut down, while port 1/1/7 is still forwarding. Port 1/1/2 on switch 410-1 may stop receiving BPDUs, but port 1/1/2 may still forward BPDUs. Thus, switches 410-1 and 410-2 may still forward BPDUs. However, because these BPDUs do not go anywhere, there is no L2 loop.

Additionally, when ICL 416 comes from down to up (note that ICL 416 may normally be a static LAG in an MCT design, and ICL 416 'comes up' refers to the LAG becoming operational), ICL 416 would forward data traffic right away. However, this provides an opportunity for short L2 loop.

In FIG. 8, once ICL LAG goes link up, both of switches 410-1 (such as ports 1/1/1 and 1/1/2) and 410-2 (such as ports 1/1/3 and 1/1/4) will start to forward traffic to its ICL 416 in, e.g., a sub-second time period. Because both ports 1/1/1 and 1/1/2 on switch 410-3 are forwarding traffic too, a loop may be formed between switches 410-1, 410-2 and 410-3. Notably, because no ports are blocking, BPDUs from port 1/1/1 on switch 410-3 may be received by port 1/1/2 on switch 410-3.

In principle, the STP BPDU forwarding is supposed to help break the L2 loop. While BPDU forwarding is resumed after the ICL link up, the BPDUs are sent periodically in a STP network. In most cases, the hello timer or period between the BPDUs may use the default value, such as 2 s. Consequently, every 2 s there may be a BPDU send by port 1/1/1 on switch 410-3. The L2 loop may cause a data traffic storm between the time ICL 416 is up and when the first BPDU sent by 1/1/1 after ICL 416 comes up reaches port 1/1/2 on switch 410-3 (therefore, switch 410-3 may eventually block port 1/1/2). This L2 storm may cause severe consequences and may even consume all the bandwidth. In this case, in addition to a service break, the L2 and L3 protocols may also fail.

In order to address the temporary L2 loop problem when ICL 416 goes up, switches 410-1 and/or 410-2 may use a feature called 'ICL forward delay.' When the ICL LAG becomes operational, instead of just forwarding data traffic right away, switches 410-1 and/or 410-2 may delay the data traffic forwarding for a certain time interval based at least in part on a user configured an ICL forward delay timer. In some embodiments, the ICL forward delay timer value may range from 1 to 30 s. During the time interval, an MCT cluster switch (such as switch 410-1 or 410-2) may still perform the BPDU forwarding, so the STP out of MCT cluster 418 can converge before the ICL forward delay timeout. When the ICL forward delay timer times out, the ICL LAG may start forwarding data traffic and the user STP network may have already converged.

Note that the user (or a given switch) may configure the ICL forward delay to be the hello time of the system root bridge plus 2 s. For example, if the root bridge uses a hello time of 3 s, then the ICL forward delay timer may be configured to a value of 5 s.

We now describe embodiments of an electronic device, which may perform at least some of the operations in the communication techniques. FIG. 9 presents a block diagram illustrating an example of an electronic device 900 in accordance with some embodiments, such as one of computer 104, the one or more computer network devices 106, controller 108, one of access points 110 or one of electronic devices 112. This electronic device includes processing subsystem 910, memory subsystem 912, and networking subsystem 914. Processing subsystem 910 includes one or more devices configured to perform computational operations. For example, processing subsystem 910 can include one or more microprocessors, ASICs, microcontrollers, programmable-logic devices, one or more graphics process units (GPUs) and/or one or more digital signal processors (DSPs).

Memory subsystem 912 includes one or more devices for storing data and/or instructions for processing subsystem 910 and networking subsystem 914. For example, memory subsystem 912 can include dynamic random access memory (DRAM), static random access memory (SRAM), and/or other types of memory. In some embodiments, instructions for processing subsystem 910 in memory subsystem 912 include: one or more program modules or sets of instructions (such as program instructions 922 or operating system 924), which may be executed by processing subsystem 910. Note that the one or more computer programs may constitute a computer-program mechanism. Moreover, instructions in the various modules in memory subsystem 912 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 910.

In addition, memory subsystem 912 can include mechanisms for controlling access to the memory. In some embodiments, memory subsystem 912 includes a memory hierarchy that comprises one or more caches coupled to a memory in electronic device 900. In some of these embodiments, one or more of the caches is located in processing subsystem 910.

In some embodiments, memory subsystem 912 is coupled to one or more high-capacity mass-storage devices (not shown). For example, memory subsystem 912 can be coupled to a magnetic or optical drive, a solid-state drive, or another type of mass-storage device. In these embodiments, memory subsystem 912 can be used by electronic device 900 as fast-access storage for often-used data, while the mass-storage device is used to store less frequently used data.

Networking subsystem 914 includes one or more devices configured to couple to and communicate on a wired and/or wireless network (i.e., to perform network operations), including: control logic 916, an interface circuit 918 and one or more antennas 920 (or antenna elements). (While FIG. 9 includes one or more antennas 920, in some embodiments electronic device 900 includes one or more nodes, such as nodes 908, e.g., a network node that can be coupled or connected to a network or link, or an antenna node, connector or a metal pad that can be coupled to the one or more antennas 920. Thus, electronic device 900 may or may not include the one or more antennas 920.) For example, networking subsystem 914 can include a Bluetooth™ networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, a cable modem networking system, and/or another networking system.

Note that a transmit or receive antenna pattern (or antenna radiation pattern) of electronic device 900 may be adapted or changed using pattern shapers (such as reflectors) in one or more antennas 920 (or antenna elements), which can be independently and selectively electrically coupled to ground to steer the transmit antenna pattern in different directions. Thus, if one or more antennas 920 include N antenna pattern shapers, the one or more antennas may have $2^N$ different antenna pattern configurations. More generally, a given antenna pattern may include amplitudes and/or phases of signals that specify a direction of the main or primary lobe of the given antenna pattern, as well as so-called 'exclusion regions' or 'exclusion zones' (which are sometimes referred to as 'notches' or 'nulls'). Note that an exclusion zone of the given antenna pattern includes a low-intensity region of the given antenna pattern. While the intensity is not necessarily zero in the exclusion zone, it may be below a threshold, such as 3 dB or lower than the peak gain of the given antenna pattern. Thus, the given antenna pattern may include a local maximum (e.g., a primary beam) that directs gain in the direction of electronic device 900 that is of interest, and one or more local minima that reduce gain in the direction of other electronic devices that are not of interest. In this way, the given antenna pattern may be selected so that communication that is undesirable (such as with the other electronic devices) is avoided to reduce or eliminate adverse effects, such as interference or crosstalk.

Networking subsystem 914 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 900 may use the mechanisms in networking subsystem 914 for performing simple wireless communication between the electronic devices, e.g., transmitting advertising or beacon frames and/or scanning for advertising frames transmitted by other electronic devices as described previously.

Within electronic device 900, processing subsystem 910, memory subsystem 912, and networking subsystem 914 are coupled together using bus 928. Bus 928 may include an electrical, optical, and/or electro-optical connection that the subsystems can use to communicate commands and data among one another. Although only one bus 928 is shown for clarity, different embodiments can include a different number or configuration of electrical, optical, and/or electro-optical connections among the subsystems.

In some embodiments, electronic device 900 includes a display subsystem 926 for displaying information on a display, which may include a display driver and the display, such as a liquid-crystal display, a multi-touch touchscreen, etc.

Electronic device 900 can be (or can be included in) any electronic device with at least one network interface. For example, electronic device 900 can be (or can be included in): a desktop computer, a laptop computer, a subnotebook/netbook, a server, a tablet computer, a smartphone, a cellular telephone, a smartwatch, a consumer-electronic device, a portable computing device, an access point, a transceiver, a router, a switch, communication equipment, a computer network device, a stack of multiple computer network devices, a controller, test equipment, an Internet-of-Things (IoT) device, and/or another electronic device.

Although specific components are used to describe electronic device 900, in alternative embodiments, different components and/or subsystems may be present in electronic device 900. For example, electronic device 900 may include one or more additional processing subsystems, memory subsystems, networking subsystems, and/or display subsystems. Additionally, one or more of the subsystems may not be present in electronic device 900. Moreover, in some embodiments, electronic device 900 may include one or more additional subsystems that are not shown in FIG. 9. Also, although separate subsystems are shown in FIG. 9, in some embodiments some or all of a given subsystem or component can be integrated into one or more of the other subsystems or component(s) in electronic device 900. For example, in some embodiments program instructions 922 are included in operating system 924 and/or control logic 916 is included in interface circuit 918. In some embodiments, the communication techniques are implemented using information in L1, L1.5 and/or L2 of an Open Systems Interconnection (OSI) model.

Moreover, the circuits and components in electronic device 900 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of electronic device 900 and/or networking subsystem 914. The integrated circuit may include hardware and/or software mechanisms that are used for transmitting wireless signals from electronic device 900 and receiving signals at electronic device 900 from other electronic devices. Aside from the mechanisms herein described, radios are generally known in the art and hence are not described in detail. In general, networking subsystem 914 and/or the integrated circuit can include any number of radios. Note that the radios in multiple-radio embodiments function in a similar way to the described single-radio embodiments.

In some embodiments, networking subsystem 914 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII), Electronic Design Interchange Format (EDIF), OpenAccess (OA), or Open Artwork System Interchange Standard (OASIS). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used Ethernet and a Wi-Fi communication protocol as an illustrative example, in other embodiments a wide variety of communication protocols and, more generally, wired and/or wireless communication techniques may be used. Thus, the communication techniques may be used with a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program instructions 922, operating system 924 (such as a driver for interface circuit 918) or in firmware in interface circuit 918. Alternatively or additionally, at least some of the operations in the communication techniques may be implemented in a physical layer, such as hardware in interface circuit 918.

In the preceding description, we refer to 'some embodiments.' Note that 'some embodiments' describes a subset of all of the possible embodiments, but does not always specify the same subset of embodiments. Moreover, note that numerical values in the preceding embodiments are illustrative examples of some embodiments. In other embodiments of the communication techniques, different numerical values may be used. Furthermore, while particular communication protocols between computer network devices or components in a system that includes the computer network devices are described in the preceding discussion, more generally the communication techniques may be used with a wide variety of communication protocols.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer network device, comprising:
one or more ports, associated with one or more interface circuits, configured to communicate with a second computer network device, wherein the computer network device is configured to:
communicate, via the one or more ports, data packets with a corresponding one or more second ports in the second computer network device, wherein a given data packet comprises a source address and a destination address, and wherein the one or more ports and the second one or more ports specify a link between the computer network device and the second computer network device; and
when the link goes down and then comes back up, block forwarding, via the one or more ports, of additional data packets for a time interval corresponding to a predefined delay and, after the time interval, resume the forwarding of subsequent packets that occur after the additional packets.

2. The computer network device of claim 1, wherein the data packets comprise bridge protocol data units (BPDUs).

3. The computer network device of claim 1, wherein the communication comprises forwarding or broadcasting at least a subset of the data packets.

4. The computer network device of claim 1, wherein the link comprises a control or a data link.

5. The computer network device of claim 1, wherein the link comprises an inter-chassis link (ICL).

6. The computer network device of claim 1, wherein the time interval corresponds to a second time interval between sequential data packets in the data packets.

7. The computer network device of claim 1, wherein the predefined delay is configurable.

8. The computer network device of claim 1, wherein the computer network device comprises a switch or a router.

9. A non-transitory computer-readable storage medium for use in conjunction with a computer network device, the computer-readable storage medium storing program instructions that, when executed by the computer network device, cause the computer network device to perform operations comprising:
communicating, via one or more ports, data packets with a corresponding one or more second ports in a second computer network device, wherein a given data packet comprises a source address and a destination address, and wherein the one or more ports and the second one or more ports specify a link between the computer network device and the second computer network device; and
when the link goes down and then comes back up, block forwarding, via the one or more ports, of additional data packets for a time interval corresponding to a predefined delay and, after the time interval, resume the forwarding of subsequent packets that occur after the additional packets.

10. The non-transitory computer-readable storage medium of claim 9, wherein the data packets comprise bridge protocol data units (BPDUs).

11. The non-transitory computer-readable storage medium of claim 9, wherein the link comprises an inter-chassis link (ICL).

12. The non-transitory computer-readable storage medium of claim 9, wherein the time interval corresponds to a second time interval between sequential data packets in the data packets.

13. The non-transitory computer-readable storage medium of claim 9, wherein the computer network device comprises a switch or a router.

14. A method for preventing loop occurrence, comprising:
by a computer network device:
communicating, via one or more ports, data packets with a corresponding one or more second ports in a second computer network device, wherein a given data packet comprises a source address and a destination address, and wherein the one or more ports and the second one or more ports specify a link between the computer network device and the second computer network device; and
when the link goes down and then comes back up, block forwarding, via the one or more ports, of additional data packets for a time interval corresponding to a predefined delay and, after the time interval, resume the forwarding of subsequent packets that occur after the additional packets.

15. The method of claim 14, wherein the data packets comprise bridge protocol data units (BPDUs).

16. The method of claim 14, wherein the link comprises an inter-chassis link (ICL).

17. The method of claim 14, wherein the predefined delay is configurable.

18. The method of claim 14, wherein the time interval corresponds to a second time interval between sequential data packets in the data packets.

19. The method of claim 14, wherein the computer network device comprises a switch or a router.

20. The method of claim 14, wherein the computer network device comprises a switch or a router.

* * * * *